United States Patent
Wang et al.

(10) Patent No.: US 10,728,785 B2
(45) Date of Patent: Jul. 28, 2020

(54) RADIO COMMUNICATION DEVICE AND METHOD OF MOBILE RADIO CELL MEASUREMENT REPORTING

(71) Applicant: Intel IP Corporation, Santa Clara, CA (US)

(72) Inventors: Yuanyuan Wang, Beijing (CN); Yucheng Dai, Beijing (CN); Ralf Rossbach, Neubiberg (DE)

(73) Assignee: Apple Inc., Cupertino, CA (US)

( * ) Notice: Subject to any disclaimer, the term of this patent is extended or adjusted under 35 U.S.C. 154(b) by 25 days.

(21) Appl. No.: 15/776,801

(22) PCT Filed: Dec. 17, 2015

(86) PCT No.: PCT/CN2015/097665
§ 371 (c)(1),
(2) Date: May 17, 2018

(87) PCT Pub. No.: WO2017/101057
PCT Pub. Date: Jun. 22, 2017

(65) Prior Publication Data
US 2018/0332492 A1 Nov. 15, 2018

(51) Int. Cl.
*H04W 24/10* (2009.01)
*H04B 17/309* (2015.01)
(Continued)

(52) U.S. Cl.
CPC .......... *H04W 24/10* (2013.01); *H04B 17/309* (2015.01); *H04W 36/00837* (2018.08); *H04W 48/16* (2013.01); *H04W 76/27* (2018.02)

(58) Field of Classification Search
CPC ................. H04W 24/10; H04W 48/16; H04W 36/00837; H04W 76/27; H04B 17/309
See application file for complete search history.

(56) References Cited

U.S. PATENT DOCUMENTS

| | | | |
|---|---|---|---|
| 2012/0244903 A1* | 9/2012 | Fong | H04W 8/20 455/517 |
| 2015/0189571 A1 | 7/2015 | Futaki | |
| 2016/0205575 A1 | 7/2016 | Jung et al. | |

FOREIGN PATENT DOCUMENTS

| | | | |
|---|---|---|---|
| CN | 101690359 A | 3/2010 | |
| CN | 102056219 A | 5/2011 | |

(Continued)

OTHER PUBLICATIONS

Intel Corporation; "RRM measurement for LAA"; 3GPP TSG-RAN WG2 Meeting #91bis; Oct. 2015.
(Continued)

*Primary Examiner* — Jae Y Lee
(74) *Attorney, Agent, or Firm* — Kowert, Hood, Munyon, Rankin & Goetzel, P.C.

(57) ABSTRACT

A radio communication device includes a transceiver and a cell measurement reporting circuit configured to determine for a signal reception quality related event, whether an event entry condition is fulfilled, in case the condition is fulfilled concerning a cell for the event, to add the concerned cell into a candidate reporting list, to trigger and carry out a first measurement report process for the cell included in the candidate reporting list, after having carried out the first measurement report process, to determine, for each cell included in the candidate reporting list and for which no first measurement report process has been carried out, as to whether a measurement criterion for the respective cell is fulfilled with respect to a cell for which the first measurement report process has been carried out, and to trigger and carry out a second measurement report process for each cell which fulfills the measurement criterion.

20 Claims, 7 Drawing Sheets

(51) Int. Cl.
*H04W 36/00* (2009.01)
*H04W 48/16* (2009.01)
*H04W 76/27* (2018.01)

(56) References Cited

FOREIGN PATENT DOCUMENTS

| | | |
|---|---|---|
| CN | 104541538 A | 4/2015 |
| WO | 2008157800 A1 | 12/2008 |
| WO | 2015023159 A1 | 2/2015 |

OTHER PUBLICATIONS

International Search Report based on application No. PCT/CN2015/097665 dated Sep. 13, 2016 (11 pages) (reference purpose only).

\* cited by examiner

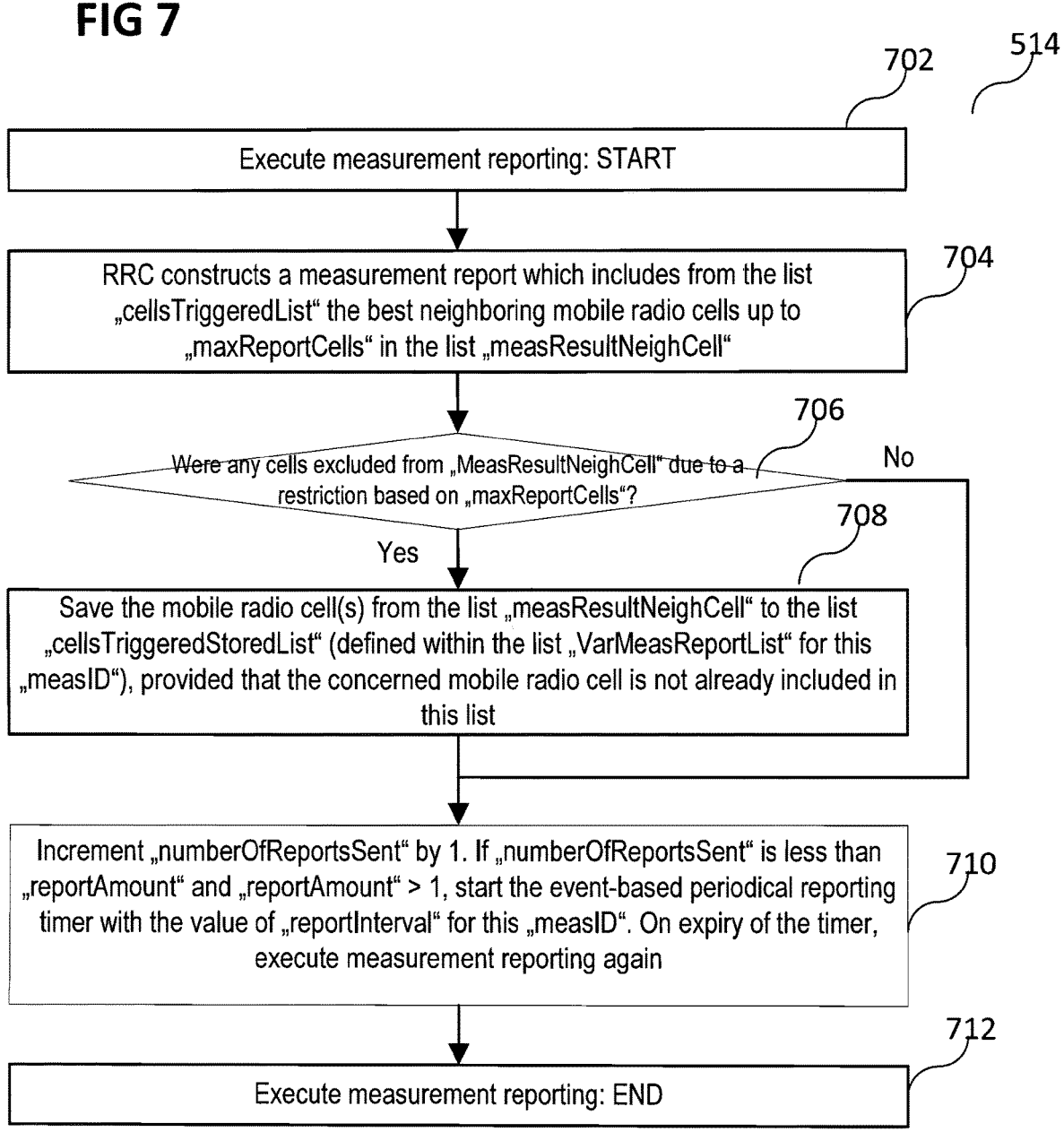

RADIO COMMUNICATION DEVICE AND METHOD OF MOBILE RADIO CELL MEASUREMENT REPORTING

CROSS-REFERENCE TO RELATED APPLICATION

The present application is a national stage entry according to 35 U.S.C. § 371 of PCT application No.: PCT/CN2015/097665 filed on Dec. 17, 2015, and is incorporated herein by reference in its entirety and for all purposes.

TECHNICAL FIELD

Various aspects of this disclosure relate to a radio communication device and a method of mobile radio cell measurement reporting.

BACKGROUND

Various aspects of this disclosure relate generally to wireless communications, e.g. to systems and methods for implementing measurement reporting in fourth generation mobile radio communications technology (4G). The $3^{rd}$ Generation Partnership Project (3GPP) and its Long Term Evolution (LTE) mobile radio communications technology describe the general principles and functionality of 4G systems. In an LTE mobile radio communications system, a mobile radio communication terminal device (also referred to as User Equipment (UE)) usually communicates through the so-called Evolved Universal Terrestrial Radio Access (E-UTRA) with other users, servers, and entities in a mobile radio communications network. A UE typically exchanges information with the eNodeB (a radio base station) over the air interface. In order to provide the mobile radio communications network with continuous information about its current radio conditions, the UE measures certain parameters in accordance with the measurement configuration setup by the E-UTRAN (e.g. by an RRC_CONNECTION_RECONFIGURATION message). The measurement results are transmitted to the eNodeB in a measurement report message.

The UE has to obey the rules set out in 3GPP 36.331, however, the procedure for event triggered measurement reporting inherits a deficiency and can be improved. For the so-called neighbor cell measurement reporting through events A3, A4, A5, A6, B1 and B2, using the current 3GPP procedure, the UE may sometimes be unable to report the best neighbor mobile radio cell to the mobile radio communications network. Note whether or not the best neighbor mobile radio cell gets reported may be subject to the exact sequence of events and conditions over a period of time as well as the specific measurement configuration. Depending on the sequence of events and conditions, the best neighbor may or may not get reported. Moreover, following a neighboring mobile radio cell change, some scenarios exist where the best neighbor mobile radio cell can never get reported to the mobile radio communications network.

SUMMARY

A radio communication device includes a transceiver and a cell measurement reporting circuit configured to determine for a signal reception quality related event, whether an event entry condition is fulfilled, in case the condition is fulfilled concerning a cell for the event, to add the concerned cell into a candidate reporting list, to trigger and carry out a first measurement report process for the cell included in the candidate reporting list, after having carried out the first measurement report process, to determine, for each cell included in the candidate reporting list and for which no first measurement report process has been carried out, as to whether a measurement criterion for the respective cell is fulfilled with respect to a cell for which the first measurement report process has been carried out, and to trigger and carry out a second measurement report process for each cell which fulfills the measurement criterion.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 7 shows a flow diagram illustrating a sub-process "execute measurement reporting" of the process of measurement reporting.

DESCRIPTION

Figure 1:
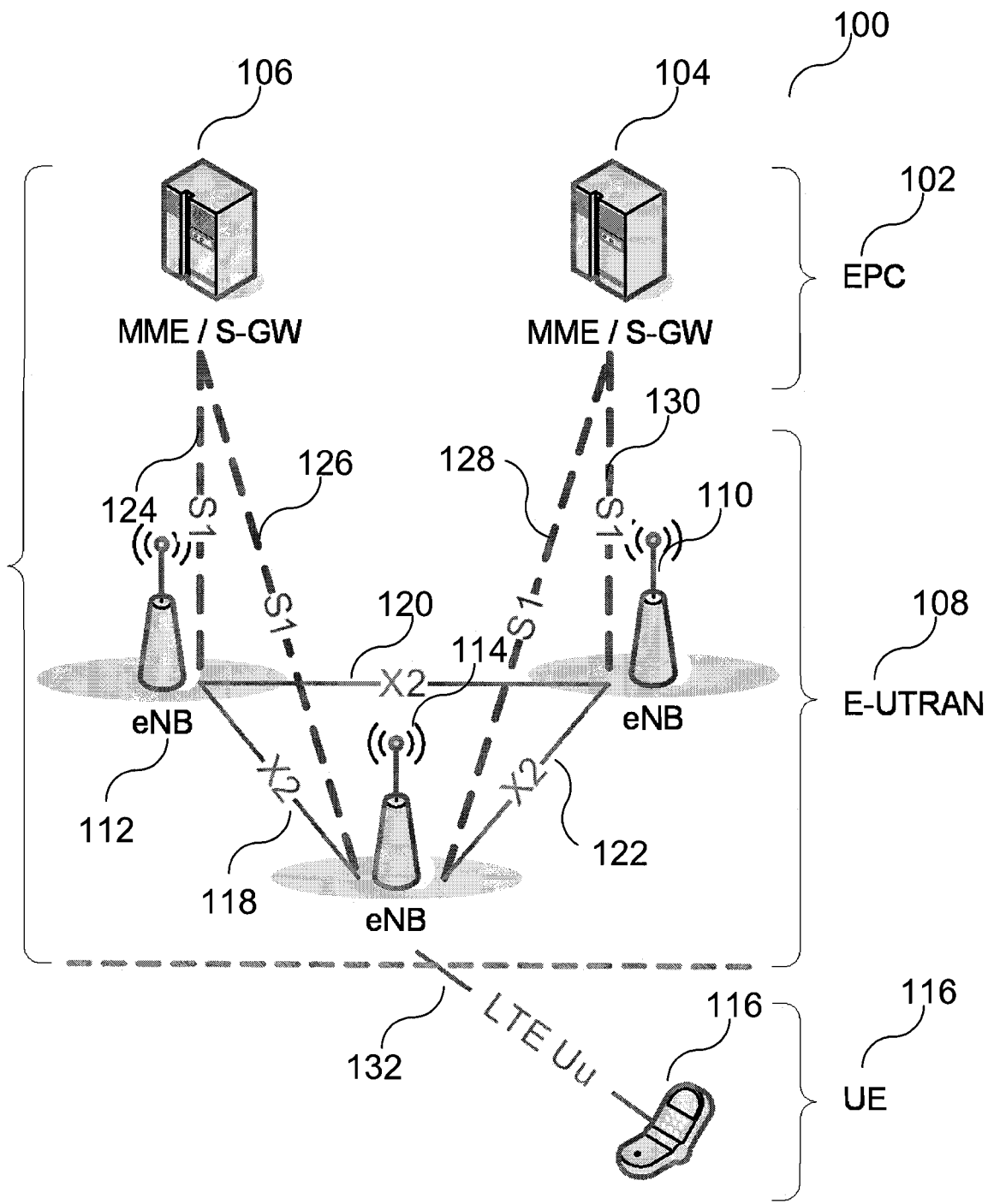
FIG. 1 shows a mobile radio communication system in accordance with an aspect of this disclosure.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

In an aspect of this disclosure, a "circuit" may be understood as any kind of a logic implementing entity, which may be hardware, software, firmware, or any combination thereof. Thus, in an aspect of this disclosure, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be software being implemented or executed by a processor, e.g. any kind of computer program, e.g. a computer program using a virtual machine code such as, e.g. Java. Any other kind of implementation of the respective functions which will be described in more detail below may also be understood as a "circuit" in accordance with an aspect of this disclosure.

The terms "coupling" or "connection" are intended to include a direct "coupling" or direct "connection" as well as an indirect "coupling" or indirect "connection" respectively.

The term "protocol" is intended to include any piece of software and/or hardware, that is provided to implement part of any layer of the communication definition. "Protocol" may include the functionality of one or more of the following layers: physical layer (layer 1), data link layer (layer 2), network layer (layer 3), or any other sub-layer of the mentioned layers or any upper layer.

The communication protocol layers and its respective entities which will be described in the following may be implemented in hardware, in software, in firmware, or partially in hardware, and/or partially in software, and/or partially in firmware. In an aspect of this disclosure, one or more communication protocol layers and its respective entities may be implemented by one or more circuits. In an aspect of this disclosure, at least two communication protocol layers may be commonly implemented by one or more circuits.

Although various aspects of this disclosure are described in connection with Long Term Evolution (LTE) or LTE Advanced (LTE-A) mobile radio communications network, it is to be noted that this should not be considered limiting. Various aspects of this disclosure may also be applied in any mobile radio communications network in which a similar scenario as described in the following may occur.

Various aspects of this disclosure address a situation in which a measurement report field 'maxReportCells'—set by the mobile radio communications network in an Information Element (IE) "ReportConfigEUTRA"—limits the number of event triggered mobile radio cells included in a measurement report. Tracking of mobile radio cells eligible for event triggered measurements involves the list "cellsTriggeredList" (a list of mobile radio cells internal to a communication terminal device such as e.g. a User Equipment (UE)). For each Measurement Identifier (measId) with the parameter "triggerType" set to event, if the entry condition applicable for a measurement event is fulfilled, the UE adds this mobile radio cell to the list "cellsTriggeredList" and initiates the measurement reporting procedure. A mobile radio cell stays in the list "cellsTriggeredList" until the leaving condition applicable for this event is fulfilled.

The measurement report contains in the measurement report field "measResultNeighCells" of the IE "MeasResults" the best neighboring mobile radio cells from the list "cellsTriggeredList" up to the number indicated in the parameter "maxReportCells". If a mobile radio cell got admitted to the list "cellsTriggeredList" but could not get included to the measurement report due to a restriction based on the measurement report field parameter "maxReportCells", this mobile radio cell is not the best neighbor mobile radio cell. However, radio conditions can change and the same mobile radio cell may become the best neighbor mobile radio cell later on. In this case the same mobile radio cell may not trigger a measurement procedure again because its entry condition was already fulfilled.

The same mobile radio cell may get reported as the best neighbor mobile radio cell if another measurement report is triggered for a different reason (such as another mobile radio cell satisfying the leaving condition, a new mobile radio cell being admitted to the list "cellsTriggeredList", or expiration of the periodical reporting timer). These events are not necessarily related with the initial event and the change of the best neighbor mobile radio cells.

Various methods of this disclosure describe a way to solve this above described scenario.

FIG. 1 shows a portion 100 of a mobile radio communication system in accordance with an aspect of this disclosure. Although various implementations are described in the context of an implementation in accordance with the Long Term Evolution (LTE) standard as described in 3GPP TS 36.300 v 10.3.0, it is to be noted that various implementations may also be implemented in accordance with other mobile radio communication systems as mentioned above.

The air interface of an LTE mobile radio communication system, or E-UTRA (Evolved Universal Terrestrial Radio Access) is commonly referred to as '3.9G', although some North American operators recently made an attempt to name their LTE service offerings '4G' for marketing reasons. The first LTE release specified by 3GPP is Rel-8.

In comparison with its predecessor UMTS, an LTE mobile radio communication system or an LTE Advanced (LTE-A) mobile radio communication system in accordance with an aspect of this disclosure offers an air interface that has been further optimized for packet data transmission by improving the system capacity and the spectral efficiency. Among other enhancements, the maximum net transmission rate has been increased significantly, namely to 300 Mbps in the downlink transmission direction and to 75 Mbps in the uplink transmission direction. LTE supports scalable bandwidths of from 1.4 MHz to 20 MHz and is based on new multiple access methods, such as OFDMA/TDMA (Orthogonal Frequency Division Multiple Access/Time Division Multiple Access) in downlink direction (in other words, in a communication direction from a mobile radio tower, e.g. a base station or eNodeB, to a mobile radio communication terminal device, such as a handset device) and SC-FDMA/TDMA (Single Carrier Frequency Division Multiple Access/Time Division Multiple Access) in uplink direction (in other words, in a communication direction from a mobile radio communication terminal device, such as a handset device to a mobile radio tower, e.g. a base station or eNodeB). OFDMA/TDMA is a multicarrier multiple access method in which a subscriber is provided with a defined number of subcarriers in the frequency spectrum and a defined transmission time for the purpose of data transmission. The RF (radio frequency) capability of an LTE mobile radio communication terminal device, such as e.g. an LTE User Equipment (UE=mobile station, cell phone) for transmission and reception has been set to 20 MHz. A physical resource block (PRB) is the baseline unit of allocation for the physical channels defined in LTE. It may include a matrix of 12 subcarriers by 6 or 7 OFDMA/SC-FDMA symbols. At the physical layer a pair of one OFDMA/SC-FDMA symbol and one subcarrier is denoted as a 'resource element'.

As shown in FIG. 1, the portion 100 of the LTE mobile radio communication system in accordance with an aspect of this disclosure may include a core network 102, also referred to as Evolved Packet Core (EPC) 102, which may include, inter alia, one or more Mobility Management Entities/Serving Gateways (MME/S-GW) 104, 106. The portion 100 of the LTE mobile radio communication system may further include an Evolved Universal Terrestrial Radio Access Network (E-UTRAN) 108, which may include one or more base stations 110, 112, 114, which may also referred to as Evolved NodeBs (eNBs) 110, 112, 114, and one or more (in general an arbitrary number of) mobile radio communication terminal devices (as one implementation of a mobile radio communication terminal apparatus) 116, which may also be referred to as User Equipments (UEs) 116.

The E-UTRAN 108 may provide the E-UTRA user plane (Packet Data Convergence Protocol (PDCP)/Radio Link Control (RLC)/Medium Access Control (MAC)) and control plane (e.g. Radio Resource Control (RRC)) protocol terminations towards the UE 116. The eNBs 110, 112, 114 may be interconnected with each other by an X2 interface 118, 120, 122. The eNBs 110, 112, 114 may also be connected by an S1 interface 124, 126, 128, 130 to the EPC (Evolved Packet Core) 102, more specifically by the S1-MME interface to the MME (Mobility Management Entity) and by the S1-U interface to the Serving Gateway (S-GW). The S1 interface 124, 126, 128, 130 supports a many-to-many relation between MMEs/S-GWs 104, 106 and eNBs 110, 112, 114. In other words, an eNB 110, 112, 114 may be connected to more than one MME/S-GW 104, 106, and an MME/S-GW 104, 106 may be connected to more than one eNB 110, 112, 114. This enables a so-called 'Network Sharing' in LTE. The UE 116 may be connected to the eNBs 110, 112, 114 e.g. via an air interface such as e.g. a so-called Uu interface 132.

Each eNB 110, 112, 114 hosts at least one of (for example all of) the following functions. In other words, each eNB 110, 112, 114 may be configured to implement at least one of (for example all of) the following functions:

Functions for Radio Resource Management: Radio Bearer Control, Radio Admission Control, Connection Mobility Control, Dynamic allocation of resources to UEs 116 in both uplink and downlink (scheduling);

IP (Internet Protocol) header compression and encryption of user data stream;

data integrity protection and verification;

selection of an MME 104, 106 at UE attachment to the E-UTRAN 108 when no routing to an MME 104, 106 can be determined from the information provided by the UE 116;

routing of User Plane data towards Serving Gateway (S-GW) 104, 106;

scheduling and transmission of paging messages (originated from the MME 104, 106);

scheduling and transmission of broadcast information (originated from the MME 104, 106 or Operations & Maintenance (O&M));

measurement and measurement reporting configuration for mobility and scheduling;

scheduling and transmission of Public Warning System (PWS), which may include Earthquake and Tsunami Warning System (ETWS) and Commercial Mobile Alert System (CMAS) messages (originated from the MME 104, 106); and closed Subscriber Group (CSG) handling.

Figure 2:
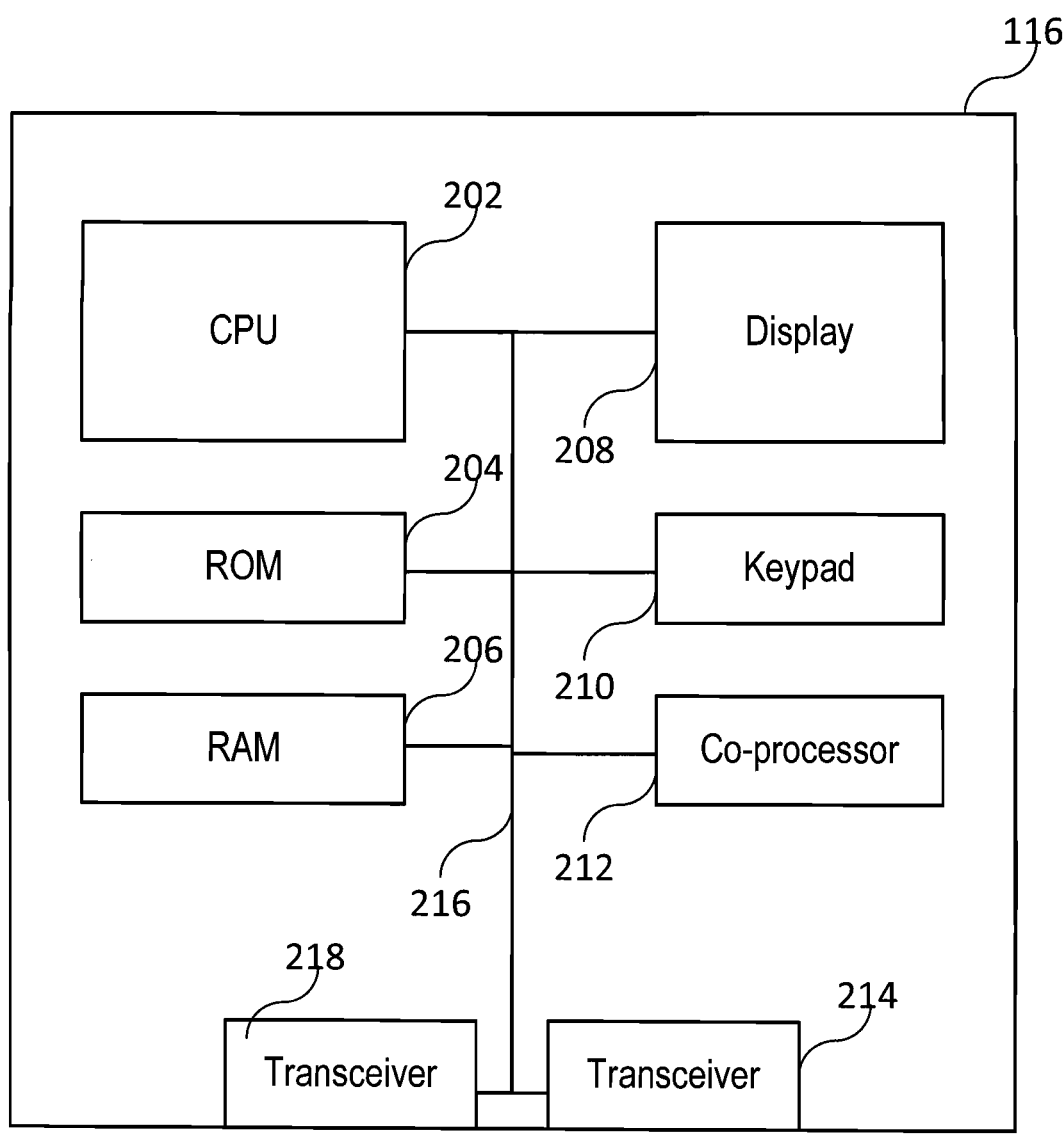
FIG. 2 shows a mobile radio communication terminal device in accordance with an aspect of this disclosure.

FIG. 2 shows a mobile radio communication terminal device 116 (e.g. the UE 116) in accordance with an aspect of this disclosure.

As shown in FIG. 2, the mobile radio communication terminal device 116, such as an LTE UE 116, may include a processor 202, such as e.g. a microprocessor (e.g. a central processing unit (CPU)) or any other type of programmable logic device. Furthermore, the mobile radio communication terminal device 116 may include a first memory 204, e.g. a read only memory (ROM) 204 and/or a second memory 206, e.g. a random access memory (RAM) 206. Moreover, the mobile radio communication terminal device 116 may include a display 208 such as e.g. a touch sensitive display, e.g. a liquid crystal display (LCD) display or a light emitting diode (LED) display, or an organic light emitting diode (OLED) display. However, any other type of display may be provided as the display 208 in alternative implementations. The mobile radio communication terminal device 116 may in addition include any other suitable output device (not shown) such as e.g. a loudspeaker or a vibration actuator. The mobile radio communication terminal device 116 may include one or more input devices such as keypad 210 including a plurality of keys. The mobile radio communication terminal device 116 may in addition include any other suitable input device (not shown) such as e.g. a microphone. In case the display 208 is implemented as a touch sensitive display 208, the keypad 210 may be implemented by the touch sensitive display 208. Moreover, optionally, the mobile radio communication terminal device 116 may include a co-processor 212 to take processing load from the processor 202. Furthermore, the mobile radio communication terminal device 116 may include a transceiver 214. The above described components may be coupled with each other via one or more lines, e.g. implemented as a bus 216. The first memory 204 and/or the second memory 206 may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory) or a CBRAM (Conductive Bridging Random Access Memory). The program code used to be executed and thereby to control the processor 202 (and optionally the co-processor 212) may be stored in the first memory 204. Data (e.g. the messages received or to be transmitted via the transceiver 214) to be processed by the processor 202 (and optionally the co-processor 212) may be stored in the second memory 206. The transceiver 214 may be configured to implement a Uu interface 132 in accordance with LTE. The mobile radio communication terminal device 116 and the transceiver 214 may also be configured to provide MIMO radio transmission. Further, the mobile radio communication terminal device 116 may also include an additional transceiver 218, which may be configured to implement a short range radio technology, such as one as will be described in more detail below.

Figure 3:
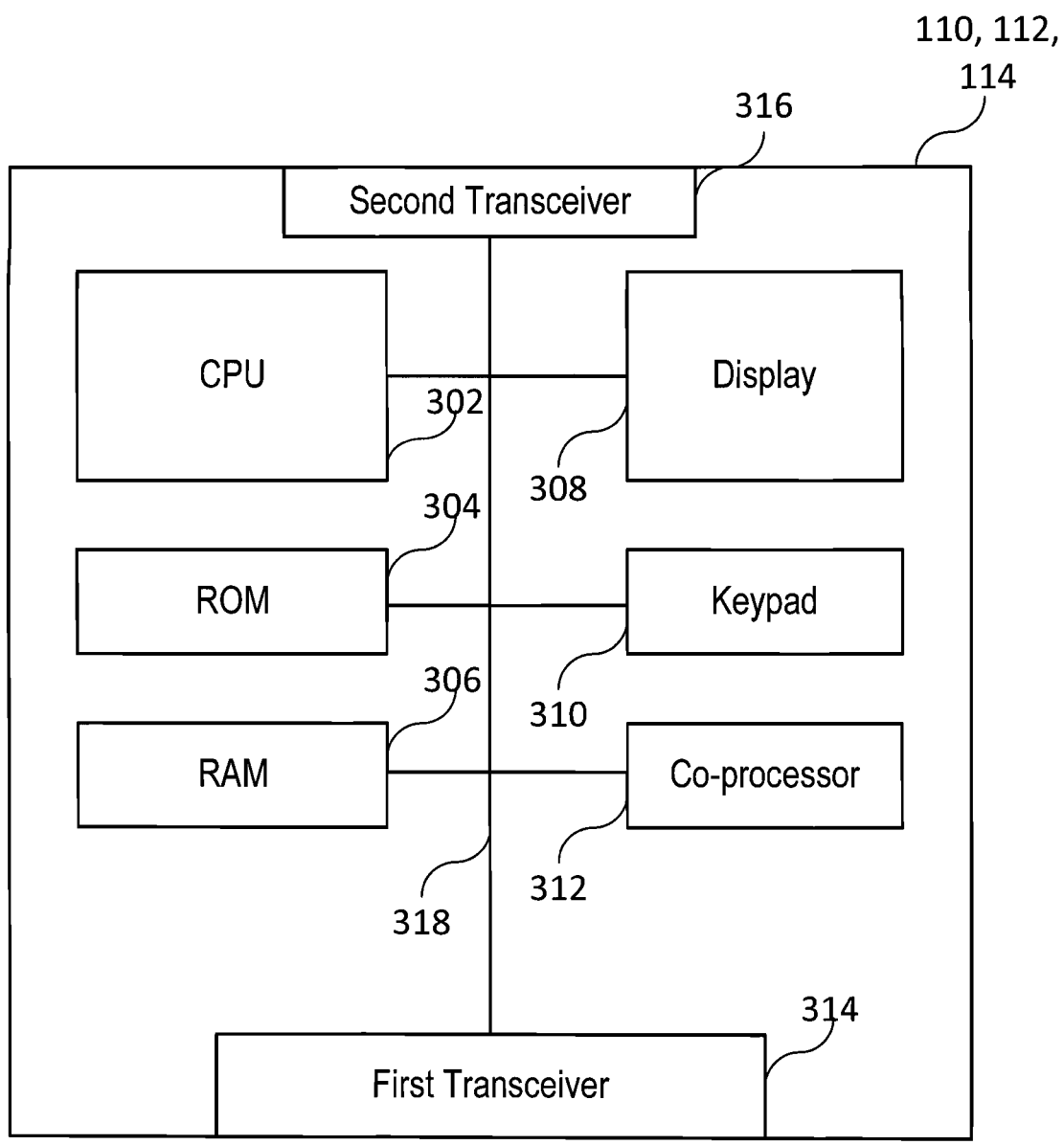
FIG. 3 shows a mobile radio communication base station device in accordance with an aspect of this disclosure.

FIG. 3 shows a mobile radio communication base station device (such as an LTE Evolved NodeB or eNB) 110, 112, 114 in accordance with an aspect of this disclosure.

As shown in FIG. 3, the eNodeB 110, 112, 114, may include a processor 302, such as e.g. a microprocessor (e.g. a central processing unit (CPU)) or any other type of programmable logic device. Furthermore, eNB 110, 112, 114 may include a first memory 304, e.g. a read only memory (ROM) 304, and/or a second memory 306, e.g. a random access memory (RAM) 306. Moreover, the eNB 110, 112, 114 may include a display 308 such as e.g. a touch sensitive display, e.g. a liquid crystal display (LCD) display or a light emitting diode (LED) display, or an organic light emitting diode (OLED) display. However, any other type of display may be provided as the display 308 in alternative implementations. The eNB 110, 112, 114 may in addition include any other suitable output device (not shown) such as e.g. a loudspeaker or a vibration actuator. The eNB 110, 112, 114 may include one or more input devices such as keypad 310 including a plurality of keys, and/or any other suitable input device (not shown) such as e.g. a microphone. In case the display 208 is implemented as a touch sensitive display 208, the keypad 310 may be implemented by the touch sensitive display 208. The eNB 110, 112, 114 may include a co-processor 312 to take processing load from the processor 302. Furthermore, the eNB 110, 112, 114 may include a first transceiver 314 and a second transceiver 316. The above described components may be coupled with each other via one or more lines, e.g. implemented as a bus 318. The first memory 304 and/or the second memory 306 may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory) or a CBRAM (Conductive Bridging Random Access Memory). The program code used to be executed and thereby to control the processor 302 (and optionally the co-processor 312) may be stored in the first memory 304. Data (e.g. the messages received or to be transmitted via the first transceiver 314 and/or the second transceiver 316) to be processed by the processor 302 (and optionally the co-processor 312) may be stored in the second memory 306. The first transceiver 314 may be configured to implement a Uu interface 132 in accordance with LTE. Furthermore, the second transceiver 316 may be configured to implement an X2 interface 118, 120, 122 and/or an S1 interface 124, 126, 128, 130.

Now referring again to FIG. 2, the CPU 202 or another logic circuit such as a baseband circuit (not shown) may provide (in other words implement) a measurement reporting procedure as will be described in more detail below.

According to 3GPP, the RAM 206 maintains a list referred to as "cellsTriggeredList" internally within the UE 116. The UE 116, e.g. the CPU 202 or e.g. a baseband circuit constructs (in other words generates) one or more measurement reports, which encompass measurement results about a number of mobile radio cells as set in a parameter "measResultsNeighCells" within an Information Element (IE) "MeasResultsIE".

Furthermore, the UE 116, e.g. the CPU 202 may identify a delta between mobile radio cells as listed in a list "measResultsNeighCells" (a list which includes all those mobile radio cells for which the measurements results should be reported in the respective measurement report message to the network) and mobile radio cells as listed in the list "cellsTriggeredList" (a list which includes all those mobile radio cells which can trigger a level 3 event to thereby trigger a measurement report procedure). The UE 116 uses this knowledge of the delta to trigger measurement reports more appropriately in accordance with various aspects of this disclosure.

By way of example, a method is introduced to illustratively 1) detect any neighboring mobile radio cells excluded from being reported in a respective measurement report message as listed in the list "measResultsNeighCells", i.e., due to a restriction based on the parameter "maxReportCell";

2) record and buffer the excluded mobile radio cells in a separate list; and 3) trigger an additional measurement report when one of the previously unreported members in the list "cellsTriggeredList" becomes part of the best neighboring mobile radio cells of up to the number of mobile radio cells as indicated by the parameter "maxReportCells".

Various aspects of this disclosure may help to report more accurate neighbouring mobile radio cell measurements to the communications network when channel conditions change. The UE 116 will be able to initiate a new measurement reporting procedure whenever there is an option for a new mobile radio cell to get included to the measurement report, that is, if the communications network limits the number of reported mobile radio cells (i.e. e.g. using the parameter "maxReportCells") to a value smaller than the parameter "maxCellReport". As a result, the UE 116 continues to report the best neighbour mobile radio cell to the communications network. This may lead to a more accurate handover decision and a better call quality.

There are different options as to how the UE 116 can identify the delta of mobile radio cells included in the list "measResultsNeighCells" and the mobile radio cells included in the list "cellsTriggeredList":

For example, the UE 116 may keep a copy of the latest state of the list "measResultNeighCells" and store it along with the list "cellsTriggeredList", and the data of a given measurement ID "measId", e.g. in the RAM 206.

As an alternative, it could create another list, e.g., only including the mobile radio cells reported to the communications network or only including mobile radio cells omitted due to the parameter "maxReportCells" (whatever suits the implementation better).

By storing this information, the UE 116 may be able to identify if a mobile radio cell contained in the list "cellsTriggeredList" got excluded from the measurement report.

The UE 116 may use this information every time it evaluate new measurement results for event based measurement report triggering. One approach is to store the mobile radio cells omitted from the measurement report in a separate list, which may also be referred to as "cellsTriggeredStoredList", e.g. in the RAM 206 or in any other available memory. The list "cellsTriggeredStoredList" may be created during initiation of the measurement reporting procedure. If the UE 116 later identifies that radio conditions have changed, it can evaluate during event-based measurement report triggering if one or more mobile radio cells listed in the list "cellsTriggeredStoredList" have qualified as one of the best neighbouring mobile radio cells, in which case another measurement report can be initiated. As an implementation option, in order to avoid sending measurement report updates too frequently, the UE 116 may take into account the time a mobile radio cell (included in the list "cellsTriggeredStoredList") has been amongst the best neighbor mobile radio cells before initiating an additional measurement report. The procedure helps increase UE 116 performance; it may lead to a better handover decision e.g. in complex mobile radio cell coverage conditions.

Figure 4:
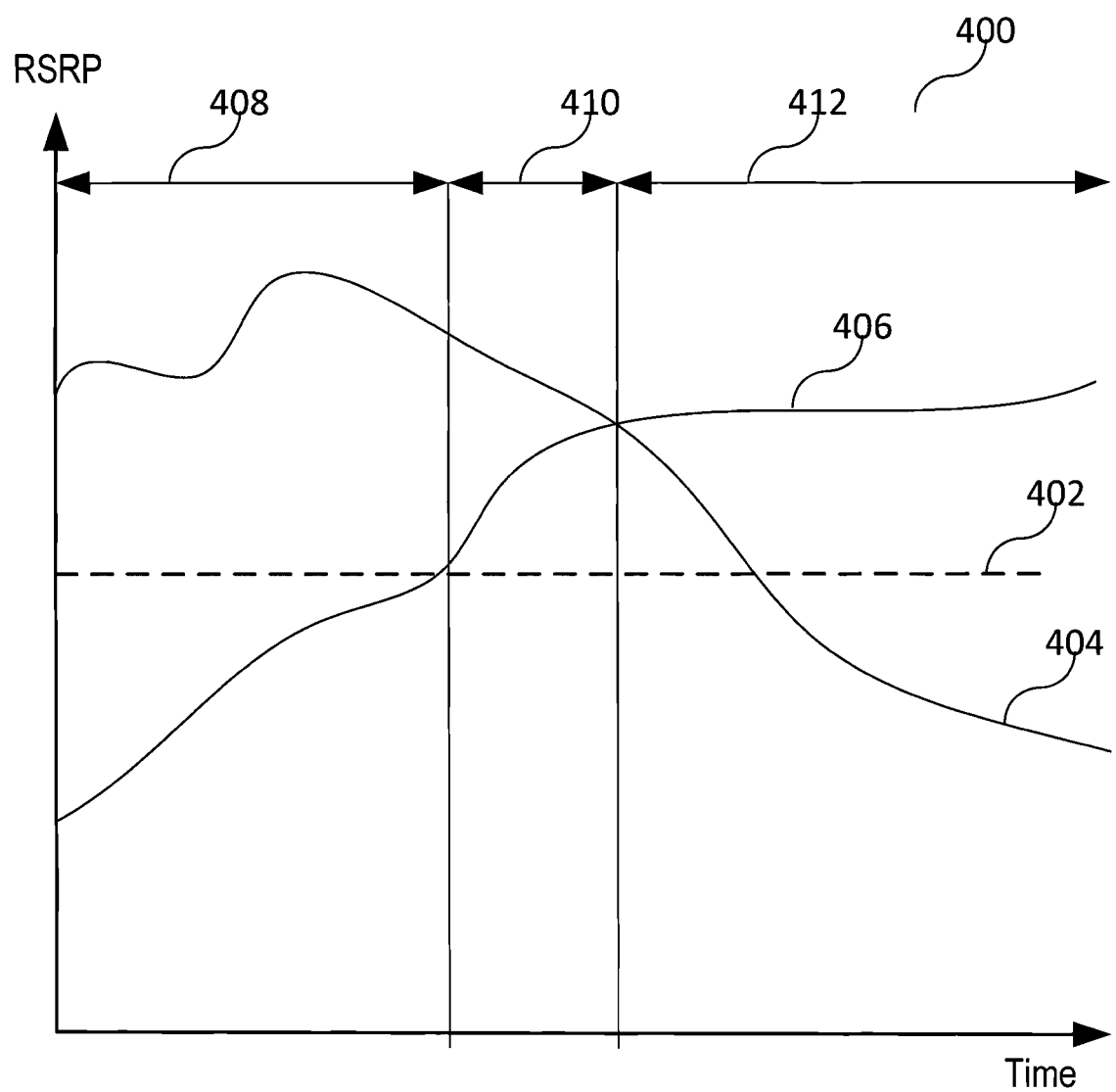
FIG. 4 shows a diagram illustrating RSRP measurement for two mobile radio cells over time.

FIG. 4 shows an example of the existing 3GPP implementation where measurement reporting is sub-optimal and the best neighbour mobile radio cell does not get reported for a first mobile radio cell A and a second mobile radio cell B. In more detail, FIG. 4 shows a diagram 400 illustrating a respectively measured RSRP (Reference Signal Received Power) signal over time for a plurality of mobile radio cell, in this example for the first mobile radio cell A (in a first characteristic curve 404) and for the second mobile radio cell B (in a second characteristic curve 406), respectively. It is to be noted that any other measured signal indicative of the receive signal quality for the UE 116 may be considered instead or in addition, such as e.g. the RSRQ (reference signal received quality). Furthermore, a threshold 402 of an entering condition of an event for triggering a measurement report procedure is shown in the diagram 400.

The UE 116 is configured to report e.g. event A3 on a mobile radio channel EARFCN_1. However, the UE 116 may implement any other layer 3 event as well.

By way of example, the UE 116 may implement one or more of the following layer 3 events to trigger a measurement report procedure:

Event A1: serving mobile radio cell becomes better than a predefined absolute threshold.

Event A2: serving mobile radio cell becomes worse than a predefined absolute threshold.

Event A3: neighbor mobile radio cell becomes offset better than primary mobile radio cell (PCell).

Event A4: neighbor mobile radio cell becomes offset better than a predefined threshold.

Event A5: PCell becomes worse than a first predefined threshold1 and neighbor mobile radio cell becomes better than a second predefined threshold2.

Event A6: neighbor mobile radio cell becomes offset better than secondary mobile radio cell (SCell).

Event B1: Inter RAT neighbor mobile radio cell becomes better than a predefined threshold.

Event B2: PCell becomes worse than the first predefined threshold1 and inter RAT neighbor mobile radio cell becomes better than the second predefined threshold2.

As illustrated in FIG. 4, there are two neighboring mobile radio cells satisfying the entry condition of this event: the first mobile radio cell A and the second mobile radio cell B.

It will be assumed that the communications network configures the parameter "maxReportCells" to a value "1" and (only for the sake of simplicity) a parameter "reportAmount" is also set to a value "1". This means, only one neighbor mobile radio cell can be included to the measurement report in this simplified example. Initially, it is assumed that the measured value "RSRP_A" of the first mobile radio cell A is higher than the measured value "RSRP_B" of the second mobile radio cell B. Therefore, a first measurement report contains the measurement values (e.g. the measured RSRP value(s)) of the first mobile radio cell A as a neighbor mobile radio cell only. This is shown in a first time period 408.

When the second mobile radio cell B satisfies the entry condition as a subsequent mobile radio cell triggering the event (within a second time period 410 as shown in FIG. 4), another measurement report is triggered. Since the first mobile radio cell A is still the best neighbor mobile radio cell and the parameter "maxReportCells" is set to the value "1", the second mobile radio cell B gets excluded from the list "measResultNeighCells" and the UE 116 sends the measurement report with just the measurement values of the first mobile radio cell A again. Yet, the UE 116 now admits the second mobile radio cell B to the list "cellsTriggeredList".

Later on, when the measured value "RSRP_B" for the second mobile radio cell B becomes better than the measured value "RSRP_A" of the first mobile radio cell A and the second mobile radio cell B is thus becoming the strongest neighbor mobile radio cell (as shown in a third time period 412 in FIG. 4), the UE 116 will not trigger another measurement report because the second mobile radio cell B is already included in the list "cellsTriggeredList".

Event triggered measurement reporting only happens on entry/leaving conditions (or when a timer expires), therefore, no further measurement reports will be triggered unless the first mobile radio cell A or the second mobile radio cell B trigger the leaving condition or a third mobile radio cell C "enters the scene" and triggers an entry condition so that the UE 116 triggers another measurement report procedure. In the depicted scenario, the UE 116 will never report the strongest neighbor mobile radio cell, i.e. for example the second mobile radio cell B to the communications network.

All of this happens because the existing 3GPP algorithm initiates event triggered measurement reporting merely based on entry conditions; it does not always attend upon changes to the best neighboring mobile radio cells.

An initial measurement report is sent to the communications network on detection of a certain entry condition for a particular event. Whether or not a measurement is triggered at a later point in time is subject to the communications network configuration and a number of other circumstances.

An overview of the event triggered measurement procedure specified by 3GPP is outlined below.

1. The physical layer (e.g. of the UE 116) reports, at the end of the reporting interval, a new set of measurement results to RRC.

2. RRC (e.g. of the UE 116) detects after applying layer 3 filtering and evaluation of the parameter "timeToTrigger" a new mobile radio cell satisfying the entry condition. This may involve several rounds of process 1, in other words the process in which the physical layer (e.g. of the UE 116) reports, at the end of the reporting interval, a new set of measurement results to RRC.

3. E.g. the UE 116 admits the mobile radio cell to the list "cellsTriggeredList" and sets the parameter "numberOfReportsSent" to 0.

4. RRC (e.g. of the UE 116) constructs a measurement report which includes from the list "cellsTriggeredList" the best neighboring mobile radio cells up to a number predefined in the parameter "maxReportCells".

5. RRC (e.g. of the UE 116) increments the value of the parameter "numberOfReportsSent" by 1.

6. If the value of the parameter "numberOfReportsSent" is less than the value of the parameter "reportAmount" and if the value of the parameter "reportAmount">1, e.g. UE 116 starts the event-based periodical reporting timer with the value of "reportInterval" for this "measId". On expiration of the timer we go back to process 3.

It is to be noted that the parameter "reportInterval" may be quite large such that the UE (e.g. UE 116) may not send another periodical measurement report for several minutes. Furthermore, the value of the parameter "reportAmount" is often set to the value "1" where periodical reporting does not happen (FIG. 4). In other configurations, the value of the parameter "reportAmount" is just set to a small number of reports after which the measurement reporting stops.

Following is a list of conditions under which event triggered measurement reporting may potentially lead to a situation in which the UE 116 may not report the best neighbor mobile radio cell.

a. "triggerType" set to event; and b. "maxReportCells" smaller than "maxCellReport" (i.e. e.g. 8); and c. for a given reporting event, the number of mobile radio cells satisfying the entry condition is greater than "maxReportCells";

d. {{"reportAmount" smaller than infinity} AND {"numberOfReportsSent" has become equal to or greater than "reportAmount" for this "measId"}} OR {"reportInterval" is configured to a large value}.

In 3GPP event triggered measurement reporting the UE (e.g. UE 116) sends a measurement report on detection of certain entry conditions. If the parameter "maxReportCells" is smaller than the parameter "maxCellReport" (i.e. e.g. 8) and the mobile radio cell was already included to the list "cellTriggeredList" before, the UE (e.g. UE 116) may not get another trigger for initiating the measurement reporting procedure. Various aspects of this disclosure may improve this.

It is to be noted that in the following, various LTE procedures are simplified. The explanation starts with an overview of a measurement reporting procedure as provided in accordance with LTE or LTE-A (see flow diagram 500 of FIG. 5).

Figure 5:
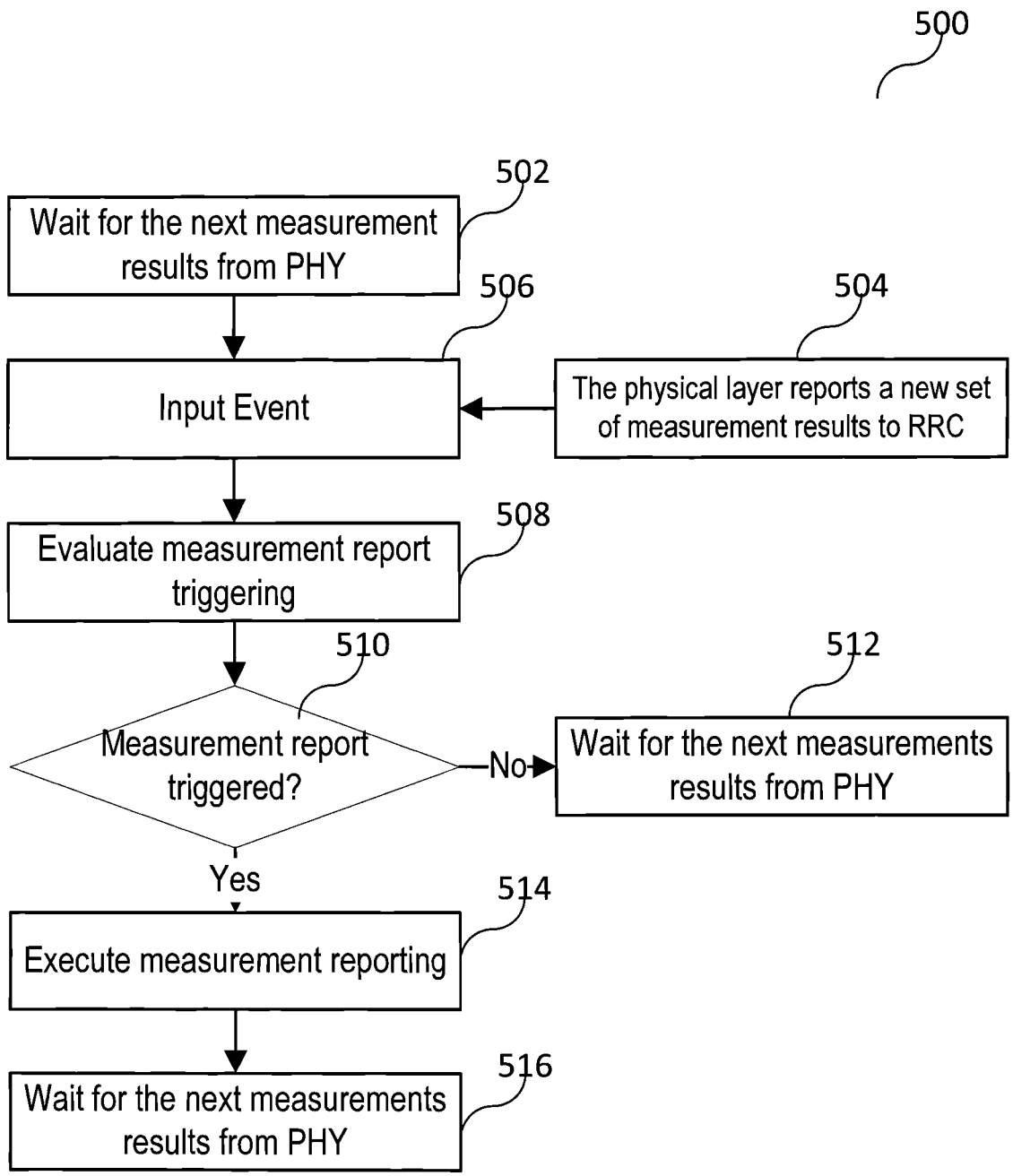
FIG. 5 shows a flow diagram illustrating a process of measurement reporting.

As shown in FIG. 5, the method includes, in 502, waiting for a next measurement from a physical layer (PHY) component of the UE 116, e.g. from a HF circuit and/or a baseband circuit of the UE 116. Furthermore, in 504, the physical layer (PHY) component of the UE 116 continuously or discontinuously measures predefined measurement values such as RSRP and/or RSRQ, and may report a new set of measurement results to a radio resource control (RRC) component of the UE 116, e.g. to the CPU 202 or the baseband circuit (not shown). After the RRC component of the UE 116 has received the new set of measurement results in 506, it may, in 508, evaluate measurement report triggering. In other words, it carries out layer 3 filtering and determines as to whether any predefined measurement report triggering event has occurred, e.g. one of the above described events A1 to A6, B1 or B2, and then checks as to whether a measurement report procedure is triggered (in 510). If the RRC component determines in 510 that no measurement report procedure is triggered ("NO" in 510), the method continues in 512, thus waiting for a next measurement from a physical layer (PHY) component of the UE 116 again. However, if the RRC component determines in 510 that a measurement report procedure is triggered ("Yes" in 510), the method 500 continues in 514 by executing measurement reporting. Then, the method 500 continues in 516, waiting for a next measurement from a physical layer (PHY) component of the UE 116 again.

In the following, the sub-process 508 (evaluate measurement report triggering) and the sub-process 514 (execute measurement reporting) will be described in more detail.

Figure 6:
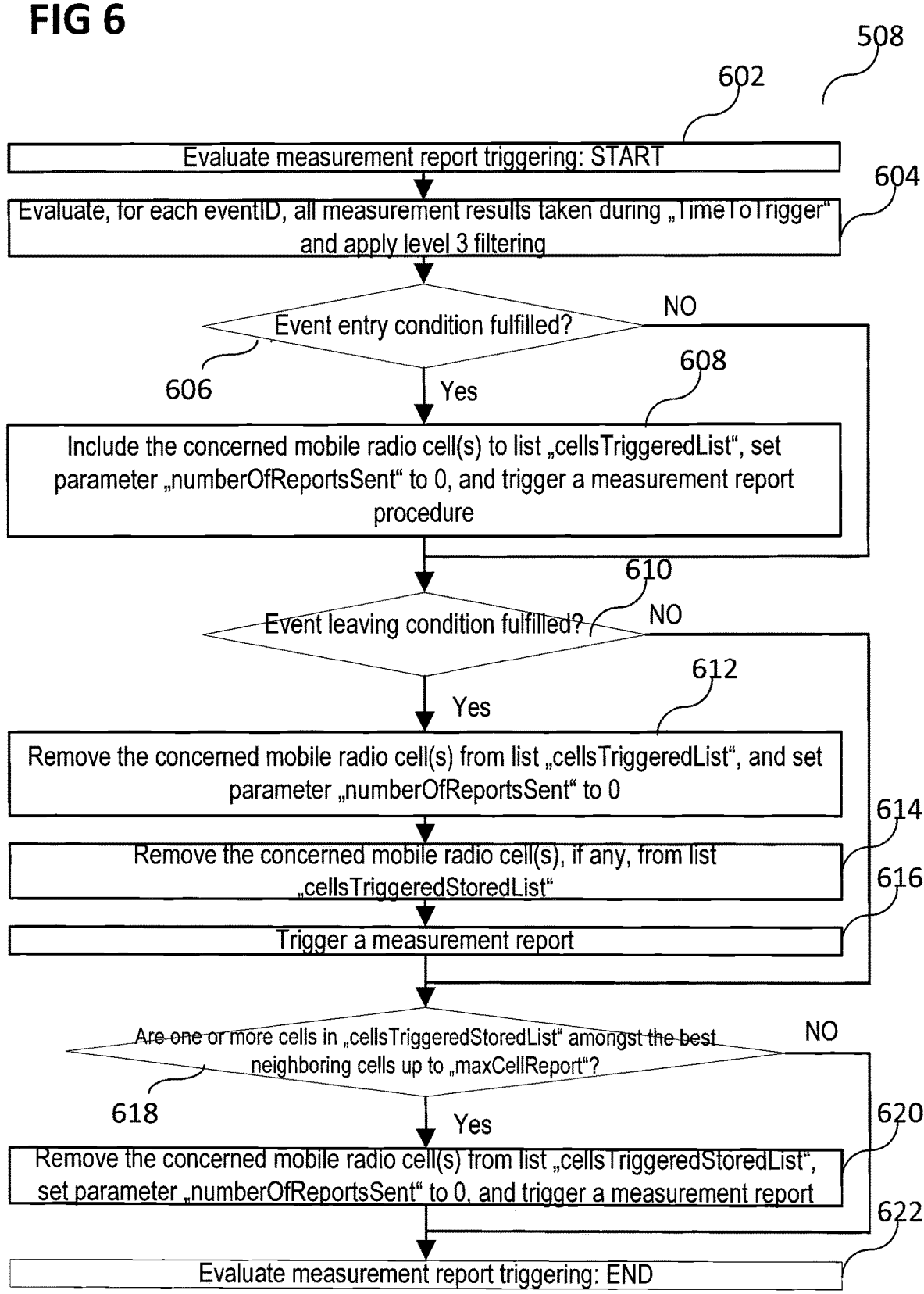
FIG. 6 shows a flow diagram illustrating a sub-process "evaluate measurement report triggering" of the process of measurement reporting.

FIG. 6 shows a flow diagram illustrating the sub-process 508 in more detail.

The CPU 202 or e.g. the baseband circuit, which carries out the sub-process 508 may start the sub-process 508 "evaluate measurement report triggering" in 602. The sub-process 508 may include, in 604, evaluating, for each eventID, in other words e.g. for each trigger event such as e.g. for each layer 3 trigger event A1 to A6 or B1 and B2 as described above, all measurement results taken during a predefined time period from the event trigger time instant to the end of the respective measurement period. The predefined time period may be defined in the UE LTE variable "TimetToTrigger". Furthermore, it may optionally apply a measurement result filtering, e.g. level 3 filtering, to the considered measurement results.

Sub-process 508 may continue in 606, e.g. by checking whether an event entry condition is fulfilled for any one of the evaluated eventID(s).

In case an event entry condition is fulfilled for one of the evaluated eventID(s) ("Yes" in 606), the CPU 202 or e.g. the baseband circuit may, in 608, include the concerned mobile radio cell(s) (in other words those mobile radio cell(s) which is/are associated with (e.g. transmit the signal(s) which fulfill the event entry condition) into the list "cellsTriggeredList". Furthermore, the CPU 202 or e.g. the baseband circuit may set the UE parameter "numberOfReportsSent" to a predefined reset value, e.g. to the value "0" and also triggers a measurement report procedure, in which CPU 202 or e.g. the baseband circuit may generate and send a measurement report to all mobile radio cell(s) from the list "cellsTriggeredList", which are also included in the list "measResultNeighCells".

Then, the sub-process 508 may continue in 610, where the CPU 202 or e.g. the baseband circuit may check as to whether an event leaving condition is fulfilled.

In case the event entry condition is not fulfilled for the evaluated eventID(s) ("No" in 606), the CPU 202 or e.g. the baseband circuit may continue in 610.

In case an event leaving condition is fulfilled ("Yes" in 610), the CPU 202 or e.g. the baseband circuit may remove the concerned mobile radio cell(s) from the list "cellsTriggeredList" and may also set the UE parameter "numberOfReportsSent" to a predefined reset value, e.g. to the value "0". Sub-process 508 may continue in 614, e.g. removing the concerned mobile radio cell(s), if any, from the above described list "cellsTriggeredStoredList" also stored e.g. in memory 206. The CPU 202 or e.g. the baseband circuit may continue the sub-process 508 in 616, e.g. by triggering a measurement report and thus may generate and send a measurement report to all mobile radio cell(s) from the list "cellsTriggeredList", which are also included in the list "measResultNeighCells". 616 may be provided in case another conventional UE parameter "reportOnLeave" is set to TRUE.

Then, the sub-process 508 may continue in 618, where the CPU 202 or e.g. the baseband circuit may check as to whether there are one or more mobile radio cells in the list "cellsTriggeredStoredList" amongst the best neighboring mobile radio cells (with respect to a predefined quality criterion such as e.g. the RSRP or RSRQ) up to a number of mobile radio cells as indicated in the UE parameter "maxCellReport", for example. As an option, the decision in 618 may take into account all measurements after e.g. layer 3 filtering taken during the time period, e.g. during "timeToTrigger".

In case the event leaving condition is not fulfilled for the evaluated eventID(s) ("No" in 610), the CPU 202 or e.g. the baseband circuit may continue in 618.

In case there are one or more mobile radio cells in the list "cellsTriggeredStoredList" amongst the best neighboring mobile radio cells up to a number of mobile radio cells as indicated in the UE parameter "maxCellReport" ("Yes" in 618), sub-process 508 may continue in 620, removing the concerned mobile radio cell(s) from the list "cellsTriggeredStoredList", setting the UE parameter "numberOfReportsSent" to a predefined reset value, e.g. to the value "0", and triggering a measurement report process.

Sub-process 508 may then end in 622.

In case there is no mobile radio cell in the list "cellsTriggeredStoredList" amongst the best neighboring mobile radio cells up to a number of mobile radio cells as indicated in the UE parameter "maxCellReport" ("No" in 618), sub-process 508 may continue in 622, thereby ending sub-process 508.

FIG. 7 shows a flow diagram illustrating the sub-process 514 in more detail.

The CPU 202 or e.g. the baseband circuit, which carries out the sub-process 514 may start the sub-process 514 "execute measurement reporting" in 702. The sub-process 514 may include, in 704, an RRC component of the UE, e.g. implemented by the CPU 202 or e.g. the baseband circuit, constructing a measurement report which includes from the list "cellsTriggeredList" the best neighboring mobile radio cells up to a number of mobile radio cells as indicated in the UE parameter "maxReportCells" in the list "measResultNeighCell".

Then, in 706, the CPU 202 or e.g. the baseband circuit checks as to whether any mobile radio cells were excluded from the list "MeasResultNeighCell" due to a restriction based on the UE parameter "maxReportCells". In other words, the UE parameter "maxReportCells" sets a maximum number of mobile radio cells (e.g. the best mobile radio cell(s)) from the list "cellsTriggeredList" to be reported from the UE (e.g. UE 116) to the communications network.

In case the CPU 202 or e.g. the baseband circuit determines that at least one mobile radio cell was excluded from the list "MeasResultNeighCell" and thus from being reported to the communications network, the CPU 202 or e.g. the baseband circuit in 708 saves the mobile radio cell(s) from the list "measResultNeighCell" to the list "cellsTriggeredStoredList" (defined within the list "VarMeasReportList" for this "measID"), provided that the concerned mobile radio cell is not already included in this list.

The sub-process 514 then continues to 710, where the CPU 202 or e.g. the baseband circuit increments the UE parameter "numberOfReportsSent" by a predefined value such as e.g. by the value "1". If the UE parameter "numberOfReportsSent" is less than the UE parameter "reportAmount" and the UE parameter "reportAmount" is greater than a predefined value, e.g. than the value "1", the CPU 202 or e.g. the baseband circuit starts the event-based periodical reporting timer with the value of as set in the UE parameter "reportInterval" for this "measID". On expiry of the timer, the CPU 202 or e.g. the baseband circuit executes a measurement reporting again.

In case the CPU 202 or e.g. the baseband circuit determines that no mobile radio cell was excluded from the list "MeasResultNeighCell", the CPU 202 or e.g. the baseband circuit illustratively skips 708 and continues the sub-process 514 in 710.

Finally, the sub-process 514 ends in 712.

Illustratively, in various aspects of this disclosure, two sub-processes 'Evaluate measurement report triggering' 508 and 'Execute measurement reporting' 514 may be modified in comparison with the conventional process in accordance with LTE. FIG. 6 and FIG. 7 as described above provide further details about the functionality. The list "cellsTriggeredStoredList" may be defined within the UE variable "VarMeasReportList" for a respective "measId". The modification may be materialized in two phases.

Phase1—Measurement Reporting

For each mobile radio cell that is included in the list "cellsTriggeredList" that could not get included in the list "measResultNeighCells" due to a limitation based on the parameter "maxReportCells", the UE may include the mobile radio cell in the list "cellsTriggeredStoredList" defined within the list "VarMeasReportList" for this "measId".

Phase2—Measurement Report Triggering

If one or more mobile radio cells is/are included in the list "cellsTriggeredStoredList" is amongst the best neighboring mobile radio cells up to the number indicated by the parameter "maxReportCells", the UE may remove the mobile radio cell(s) from the list "cellsTriggeredStoredList" and may trigger a new measurement report.

In the following, various aspects of this disclosure will be illustrated:

Example 1 is a radio communication device. The radio communication device may include a transceiver configured to transmit radio signals to and to receive radio signals from a mobile radio cell, a mobile radio cell measuring circuit configured to measure a signal reception quality of a radio signal received via the transceiver, and a mobile radio cell measurement reporting circuit configured to determine for at least one predefined signal reception quality related event, whether a predefined event entry condition is fulfilled related to at least one mobile radio cell, if the predefined event entry condition is fulfilled related to the at least one mobile radio cell for the at least one predefined signal reception quality related event, add the at least one mobile radio cell into a candidate reporting list, trigger and perform a first measurement report process for the at least one mobile radio cell included in the candidate reporting list, upon completion of the first measurement report process, determine, for each remaining mobile radio cell included in the candidate reporting list, whether a predefined measurement criterion for the remaining mobile radio cell is fulfilled related to at least one other mobile radio cell included in the candidate reporting list, and to trigger and perform a second measurement report process for each of the at least one remaining mobile radio cell that fulfills the predefined measurement criterion.

In Example 2, the subject matter of Example 1 can optionally include that the mobile radio cell measurement reporting circuit is configured to determine, for each remaining mobile radio cell included in the candidate reporting list and for which no first measurement report process has been performed, whether a predefined measurement criterion for the remaining mobile radio cell is fulfilled related to at least one remaining mobile radio cell for which the first measurement report process has been performed.

In Example 3, the subject matter of any one of Examples 1 or 2 can optionally include that the mobile radio cell measurement reporting circuit is further configured to exclude each mobile radio cell included in the candidate reporting list from fulfilling the predefined event entry condition if it is included in the candidate reporting list.

In Example 4, the subject matter of any one of Examples 1 to 3 can optionally include that the radio communication device further includes a memory configured to store the candidate reporting list.

In Example 5, the subject matter of any one of Examples 1 to 4 can optionally include that the predefined measurement criterion for the at least one remaining mobile radio cell is fulfilled if the measurement for the at least one remaining mobile radio cell indicates a higher signal reception quality than the at least one mobile radio cell upon which the first measurement report process is performed.

In Example 6, the subject matter of any one of Examples 4 or 5 can optionally include that the mobile radio cell measurement reporting circuit is further configured to add each remaining mobile radio cell included in the candidate reporting list and for which no first measurement report process has been carried out into a second candidate reporting list, and to store the second candidate reporting list in the memory.

In Example 7, the subject matter of any one of Examples 1 to 6 can optionally include that the radio communication is configured in accordance with a Long Term Evolution radio communication technology.

In Example 8, the subject matter of Example 7 can optionally include that the radio communication device is configured in accordance with a Long Term Evolution Advanced radio communication technology.

In Example 9, the subject matter of any one of Examples 7 or 8 can optionally include that the candidate reporting list is a "cellsTriggeredList" in accordance with the Long Term Evolution radio communication technology.

In Example 10, the subject matter of any one of Examples 1 to 9 can optionally include that the maximum number of mobile radio cells for the first measurement report process is defined by a predefined parameter "maxCellReport" in accordance with the Long Term Evolution radio communication technology.

Example 11 is a method of mobile radio cell measurement reporting. The method may include determining for at least one predefined signal reception quality related event, whether a predefined event entry condition is fulfilled related to at least one mobile radio cell, if the predefined event entry condition is fulfilled related to the at least one mobile radio cell for the at least one predefined signal reception quality related event, adding the at least one mobile radio cell into a candidate reporting list, and triggering and performing a first measurement report process for the at least one mobile radio cell included in the candidate reporting list, upon completion of the first measurement report process, determining, for each remaining mobile radio cell included in the candidate reporting list whether a predefined measurement criterion for the remaining mobile radio cell is fulfilled related to at least one other mobile radio cell included in the candidate reporting list, and triggering and performing a second measurement report process for each of the at least one remaining mobile radio cell that fulfills the predefined measurement criterion.

In Example 12, the subject matter of Example 11 can optionally include that the method further includes determining, for each remaining mobile radio cell included in the candidate reporting list and for which no first measurement report process has been performed, whether a predefined measurement criterion for the remaining mobile radio cell is fulfilled related to at least one remaining mobile radio cell for which the first measurement report process has been performed.

In Example 13, the subject matter of any one of Examples 11 or 12 can optionally include that each mobile radio cell included in the candidate reporting list is excluded from fulfilling the predefined event entry condition if it is included in the candidate reporting list.

In Example 14, the subject matter of any one of Examples 11 to 13 can optionally include that the method further includes storing the candidate reporting list in a memory.

In Example 15, the subject matter of any one of Examples 11 to 14 can optionally include that the predefined measurement criterion for the at least one remaining mobile radio cell is fulfilled if the measurement for the at least one remaining mobile radio cell indicates a higher signal reception quality than the at least one mobile radio cell upon which the first measurement report process is performed.

In Example 16, the subject matter of any one of Examples 14 or 15 can optionally include that the method further includes storing at least one mobile radio cell included in the candidate reporting list for which the first measurement report process is not performed in a second candidate reporting list.

In Example 17, the subject matter of any one of Examples 11 to 16 can optionally include that the method is implemented in accordance with a Long Term Evolution radio communication technology.

In Example 18, the subject matter of Example 17 can optionally include that the method is implemented in accordance with a Long Term Evolution Advanced radio communication technology.

In Example 19, the subject matter of any one of Examples 17 or 18 can optionally include that the candidate reporting list is a "cellsTriggeredList" in accordance with the Long Term Evolution radio communication technology.

In Example 20, the subject matter of any one of Examples 17 to 19 can optionally include that the maximum number of mobile radio cells for the first measurement report process is defined by a predefined parameter "maxCellReport" in accordance with the Long Term Evolution radio communication technology.

Example 21 is a radio communication device. The radio communication device may include a transceiver, a cell measuring circuit configured to carry out signal reception quality measurements, a cell measurement reporting circuit configured to determine for a signal related event, whether an event entry condition is fulfilled for a signal received via the transceiver related to a cell, to add the cell into a candidate reporting list, if the event entry condition is fulfilled for the signal related event, to trigger and perform a first measurement report process for at least one cell of the candidate reporting list, upon completion of the first measurement report process, to determine, for each remaining cell included in the candidate reporting list, whether the cell provides a signal having a higher reception quality than any of the remaining cell, and perform a second measurement report process for the remaining cell if it provides a signal having a higher reception quality than the cell.

In Example 22, the subject matter of Example 21 can optionally include that the mobile radio cell measurement reporting circuit is configured to determine, for each remaining cell included in the candidate reporting list and for which no first measurement report process has been performed, whether the cell provides a signal having a higher reception quality than any of the remaining cell for which the first measurement report process has been performed.

In Example 23, the subject matter of any one of Examples 21 or 22 can optionally include that the cell measurement reporting circuit is further configured to exclude each cell included in the candidate reporting list from fulfilling the predefined event entry condition while it is included in the candidate reporting list.

In Example 24, the subject matter of any one of Examples 21 or 23 can optionally include that the radio communication device further includes a memory configured to store the candidate reporting list.

In Example 25, the subject matter of Example 24 can optionally include that the cell measurement reporting circuit is further configured to add each remaining cell included in the candidate reporting list and for which no first measurement report process has been performed into a second candidate reporting list, and to store the second candidate reporting list in the memory.

In Example 26, the subject matter of any one of Examples 21 to 25 can optionally include that the radio communication device is configured in accordance with a Long Term Evolution radio communication technology.

In Example 27, the subject matter of Example 26 can optionally include that the radio communication device is configured in accordance with a Long Term Evolution Advanced radio communication technology.

In Example 28, the subject matter of any one of Examples 26 or 27 can optionally include that the candidate reporting list is a "cellsTriggeredList" in accordance with the Long Term Evolution radio communication technology.

In Example 29, the subject matter of any one of Examples 26 to 28 can optionally include that the maximum number of mobile radio cells for the first measurement report process is defined by a predefined parameter "maxCellReport" in accordance with the Long Term Evolution radio communication technology.

Example 30 is a method of mobile radio cell measurement reporting. The method may include determining for a signal related event, whether an event entry condition is fulfilled, adding the cell into a candidate reporting list, and performing a first measurement report process for a cell included in the candidate reporting list if the event entry condition is fulfilled for the signal related event, upon completion of the first measurement report process, determining, for each remaining mobile radio cell included in the candidate reporting list, whether the cell provides a signal having a higher reception quality than any of the remaining cell, and performing a second measurement report process for the remaining cell if it provides a signal having a higher reception quality than the cell.

In Example 31, the subject matter of Example 30 can optionally include that the method further includes determining, for each remaining cell included in the candidate reporting list and for which no first measurement report process has been performed, whether the cell provides a signal having a higher reception quality than any of the remaining cell for which the first measurement report process has been performed.

In Example 32, the subject matter of any one of Examples 30 or 31 can optionally include that the method further includes excluding each cell included in the candidate reporting list from fulfilling the predefined event entry condition if it is included in the candidate reporting list.

In Example 33, the subject matter of any one of Examples 30 to 32 can optionally include that the method further includes storing the candidate reporting list.

In Example 34, the subject matter of Example 33 can optionally include that the method further includes adding each cell included in the candidate reporting list and for which no first measurement report process has been performed into a second candidate reporting list, and storing the second candidate reporting list in the memory.

In Example 35, the subject matter of any one of Examples 30 to 34 can optionally include that the method is implemented in accordance with a Long Term Evolution radio communication technology.

In Example 36, the subject matter of Example 35 can optionally include that the method is implemented in accordance with a Long Term Evolution Advanced radio communication technology.

In Example 37, the subject matter of any one of Examples 35 or 36 can optionally include that the candidate reporting list is a "cellsTriggeredList" in accordance with the Long Term Evolution radio communication technology.

In Example 38, the subject matter of any one of Examples 35 to 38 can optionally include that the maximum number of cells for the first measurement report process is defined by a predefined parameter "maxCellReport" in accordance with the Long Term Evolution radio communication technology.

In Example 39, the subject matter of any one of Examples 37 or 38 can optionally include that the candidate reporting list is a "cellsTriggeredList" in accordance with the Long Term Evolution radio communication technology.

In Example 40, the subject matter of any one of Examples 37 to 39 can optionally include that the maximum number of cells for the first measurement report process is defined by a predefined parameter "maxCellReport" in accordance with the Long Term Evolution radio communication technology.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A radio communication device, comprising:
   a transceiver configured to transmit radio signals to and to receive radio signals from a mobile radio cell;
   a mobile radio cell measuring circuit configured to measure a signal reception quality of a radio signal received via the transceiver;
   a mobile radio cell measurement reporting circuit configured to:
   determine for at least one predefined signal reception quality related event, whether a predefined event entry condition is fulfilled related to at least one mobile radio cell;
   wherein when the predefined event entry condition is fulfilled related to the at least one mobile radio cell for the at least one predefined signal reception quality related event:
   add the at least one mobile radio cell into a candidate reporting list; and
   trigger and perform a first measurement report process for the at least one mobile radio cell included in the candidate reporting list;
   upon completion of the first measurement report process, determine, for each remaining mobile radio cell included in the candidate reporting list, whether a predefined measurement criterion for the remaining mobile radio cell is fulfilled related to at least one other mobile radio cell included in the candidate reporting list, wherein the predefined measurement criterion is fulfilled when the measurement for the at least one remaining mobile radio cell indicates a higher signal reception quality than the at least one mobile radio cell upon which the first measurement report process is performed; and
   trigger and perform a second measurement report process for each of the at least one remaining mobile radio cell that fulfills the predefined measurement criterion.

2. The radio communication device of claim 1, wherein the mobile radio cell measurement reporting circuit is configured to determine, for each remaining mobile radio cell included in the candidate reporting list and for which no first measurement report process has been performed, whether a predefined measurement criterion for the remaining mobile radio cell is fulfilled related to at least one remaining mobile radio cell for which the first measurement report process has been performed.

3. The radio communication device of claim 1, wherein the mobile radio cell measurement reporting circuit is further configured to:
   add each remaining mobile radio cell included in the candidate reporting list and for which no first measurement report process has been carried out into a second candidate reporting list; and
   store the second candidate reporting list in a memory.

4. The radio communication device of claim 1, configured in accordance with a Long Term Evolution radio communication technology.

5. The radio communication device of claim 4, wherein the candidate reporting list is a "cellsTriggeredList" in accordance with the Long Term Evolution radio communication technology.

6. The radio communication device of claim 4, wherein the maximum number of mobile radio cells for the first measurement report process is defined by a predefined parameter "maxCellReport" in accordance with the Long Term Evolution radio communication technology.

7. The radio communication device of claim 1, wherein the first measurement report process, which is triggered and performed when the at least one mobile radio cell is added to the candidate reporting list, comprises reporting some but not all of the mobile radio cells in the candidate reporting list, and wherein the remaining mobile radio cell comprises the mobile radio cells in the candidate reporting list that were not reported in the first measurement report process.

8. The radio communication device of claim 1, wherein the second measurement report process is triggered and performed based on when a respective one of the at least one remaining mobile radio cell fulfills the predefined measurement criterion and a time related to when said respective one of the at least one remaining mobile radio cell has been reported as amongst the best neighboring mobile radio cells.

9. A method of mobile radio cell measurement reporting, the method comprising:
   determining for at least one predefined signal reception quality related event, whether a predefined event entry condition is fulfilled related to at least one mobile radio cell;
   wherein when the predefined event entry condition is fulfilled related to the at least one mobile radio cell for the at least one predefined signal reception quality related event:
      adding the at least one mobile radio cell into a candidate reporting list; and
      triggering and performing a first measurement report process for the at least one mobile radio cell included in the candidate reporting list;
   upon completion of the first measurement report process, determining, for each remaining mobile radio cell included in the candidate reporting list whether a predefined measurement criterion for the remaining mobile radio cell is fulfilled related to at least one other mobile radio cell included in the candidate reporting list, wherein the predefined measurement criterion is fulfilled when the measurement for the at least one remaining mobile radio cell indicates a higher signal reception quality than the at least one mobile radio cell upon which the first measurement report process is performed; and
   triggering and performing a second measurement report process for each of the at least one remaining mobile radio cell that fulfills the predefined measurement criterion.

10. The method of claim 9, further comprising:
determining, for each remaining mobile radio cell included in the candidate reporting list and for which no first measurement report process has been performed, whether a predefined measurement criterion for the remaining mobile radio cell is fulfilled related to at least one remaining mobile radio cell for which the first measurement report process has been performed.

11. The method of claim 9, further comprising:
storing the candidate reporting list in a memory.

12. A radio communication device, comprising:
a transceiver;
a cell measuring circuit configured to carry out signal reception quality measurements;
a cell measurement reporting circuit configured to:
   determine for a signal related event, whether an event entry condition is fulfilled for a signal received via the transceiver related to a cell;
   add the cell into a candidate reporting list when the event entry condition is fulfilled for the signal related event,
   trigger and perform a first measurement report process for at least one cell of the candidate reporting list when the event entry condition is fulfilled for the signal related event;
   upon completion of the first measurement report process, determine, for each remaining cell included in the candidate reporting list, whether any remaining cell provides a signal having a higher reception quality than a signal provided by the cell; and
   perform a second measurement report process for a respective each remaining cell when the respective each remaining cell provides a signal having a higher reception quality than the signal provided by the cell.

13. The radio communication device of claim 12, wherein the cell measurement reporting circuit is configured to determine, for each remaining cell included in the candidate reporting list and for which no first measurement report process has been performed, whether the respective each remaining cell provides a signal having a higher reception quality than a signal provided by any of the cells for which the first measurement report process has been performed.

14. The radio communication device of claim 13, wherein the cell measurement reporting circuit is further configured to:
   add each remaining mobile radio cell included in the candidate reporting list and for which no first measurement report process has been carried out into a second candidate reporting list; and
   store the second candidate reporting list in a memory.

15. The radio communication device of claim 12, wherein the cell measurement reporting circuit is further configured to determine whether the cell is already included in the candidate reporting list and to determine that the cell does not fulfill the event entry condition while the cell is already included in the candidate reporting list.

16. The radio communication device of claim 15, wherein the cell measurement reporting circuit is further configured to:
   add each remaining cell that is included in the candidate reporting list and for which no first measurement report process has been performed into a second candidate reporting list; and
   store the second candidate reporting list in a memory.

17. The radio communication device of claim 12, configured in accordance with a Long Term Evolution radio communication technology.

18. The radio communication device of claim 17, wherein the candidate reporting list is a "cellsTriggeredList" in accordance with the Long Term Evolution radio communication technology.

19. The radio communication device of claim 17, wherein the maximum number of mobile radio cells for the first measurement report process is defined by a predefined parameter "maxCellReport" in accordance with the Long Term Evolution radio communication technology.

20. The radio communication device of claim 12, wherein the second measurement report process is triggered and performed based on when a respective one of the at least one remaining mobile radio cell fulfills measurement criterion and a time related to when said respective one of the at least one remaining mobile radio cell has been reported as amongst the best neighboring mobile radio cells.

* * * * *